Figure 1:
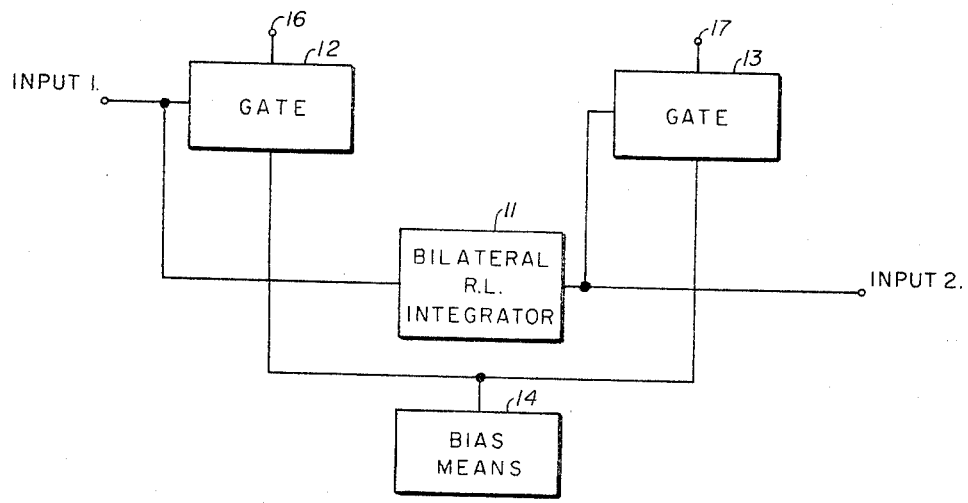

Aug. 30, 1966    L. W. DUCOTE    3,270,287
TIME-SPACED MULTIPLE PULSE GENERATOR
Filed May 17, 1963    2 Sheets-Sheet 1

INVENTOR.
LOUIS W. DUCOTE
BY
*Roland G. Anderson*
ATTORNEY

Aug. 30, 1966   L. W. DUCOTE   3,270,287
TIME-SPACED MULTIPLE PULSE GENERATOR
Filed May 17, 1963   2 Sheets-Sheet 2
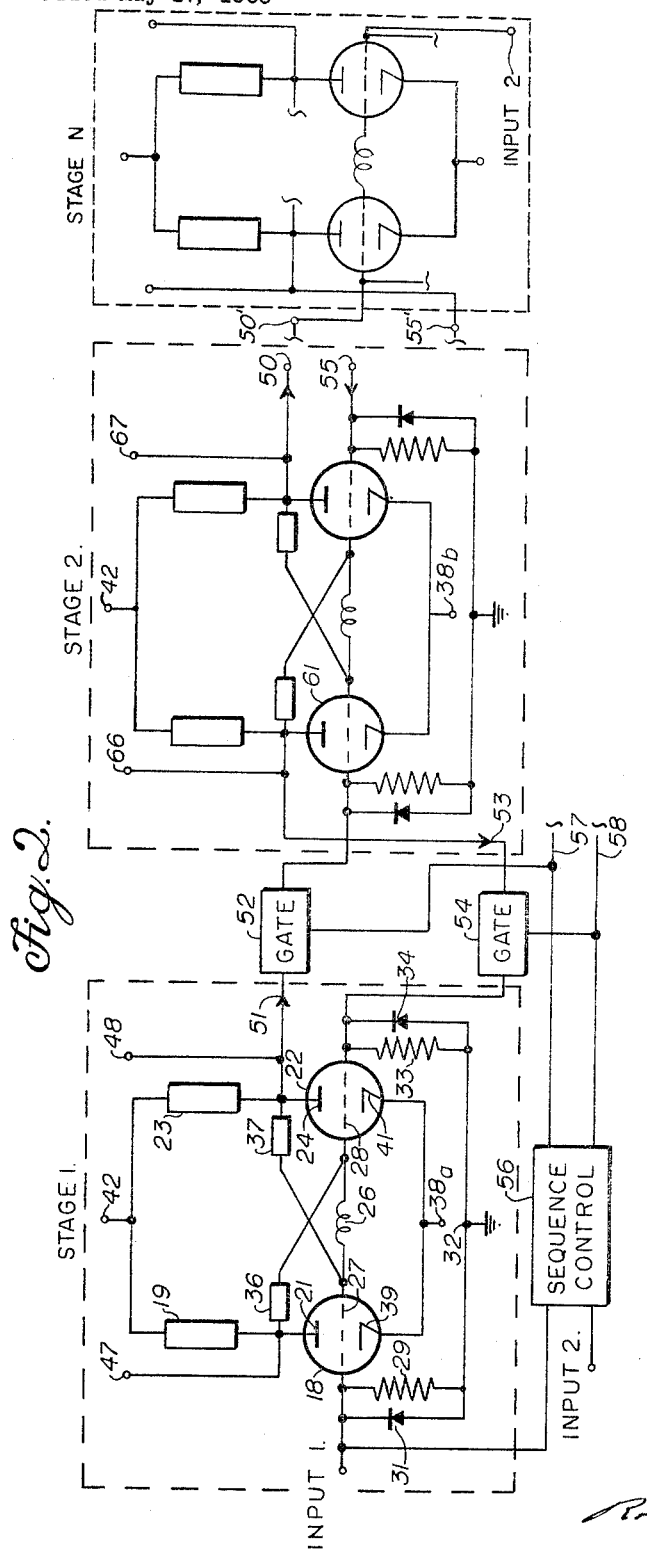
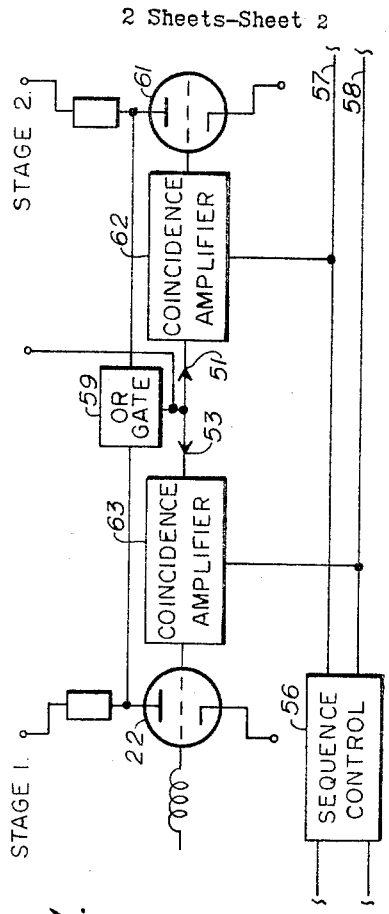
INVENTOR.
LOUIS W. DUCOTE
BY
ATTORNEY United States Patent Office 3,270,287
Patented August 30, 1966

3,270,287
TIME-SPACED MULTIPLE GENERATOR
Louis W. Ducote, Castro Valley, Calif., assignor to the United States of America as represented by the United States Atomic Energy Commission
Filed May 17, 1963, Ser. No. 281,376
8 Claims. (Cl. 328—62)

The invention described herein was made in the course of, or under, Contract W-7405-ENG-48 with the United States Atomic Energy Commission.

The present invention relates in general to electrical circuits for generating multiple pulses. More particularly, it relates to an electrical circuit designed to convert a single pulse into a time-spaced sequence of identical pulses.

Generally, circuits employing RC (i.e., resistance-capacitance) integrating or transmission line techniques are utilized to convert a single pulse into a plurality of pulses spaced in time sequence. However, there are disadvantages and limitations associated with such circuits. For example, pulses generated by circuits employing RC integrating techniques bear little resemblance to each other. To overcome this undesirable characteristic, additional circuits are required to shape the pulses. In circuits employing transmission line techniques, the sequence of the output pulses is fixed (the delay pulse will always appear at the same output terminal) unless elaborate circuits are used.

The present invention employs RL (i.e., resistance-inductance) integrating techniques to establish a time delay between a pair of identical pulses generated in response to a single input pulse. More specifically, the present invention comprises a first and a second gate circuit. Of primary importance to the ends of the invention the multiple pulse generator further includes a bilateral RL integrating network electrically connected between the input of the first gate circuit and the input of the second gate circuit. The operation of the circuit is initiated by introducing a pulse directly to the input of either the first or second gate circuit. The gate circuit receiving the input pulse directly responds by issuing a first output pulse. The input pulse is simultaneously introduced to the RL integrating network. The RL integrating network transmits an integrated form of the input pulse to the remaining gate circuit resulting in delaying the drive to the remaining gate circuit by a predetermined time interval. The remaining gate circuit responds to the integrated input pulse by issuing a second output pulse identical to and delayed in time from the first output pulse.

As a result of the bilateral characteristic of the RL integrating network (a network which integrates a pulse independently of the direction of transmission through the network), the output pulse sequence may be reversed by introducing the input pulse to the second gate circuit rather than the first.

Accordingly, it is an object of this invention to provide an electrical circuit that will convert a single pulse into a time-spaced sequence of identical pulses.

More particularly, it is an object of this invention to provide such a circuit wherein the output sequence of the time-spaced pulses may be reversed.

It is a further object of this invention to provide such a circuit wherein the pair of pulses are separated in time by a delay which may be varied.

Another object of this invention is to provide such a circuit wherein the time delay separating the sequence of pulses is established by RL integrating techniques.

Figure 3:
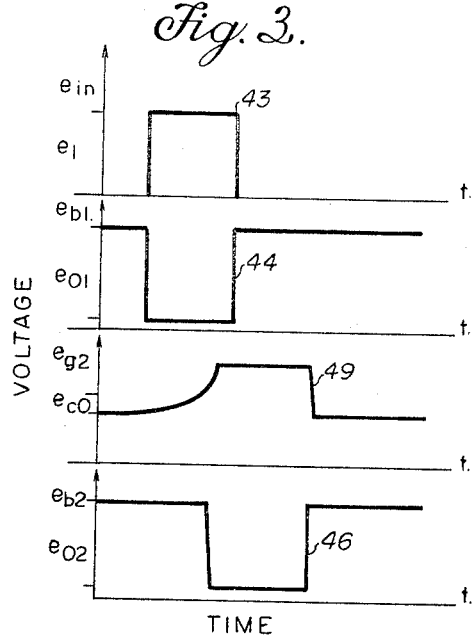

The manner of achieving these and other objects and advantages will be apparent to those skilled in the art from the following detailed description of a preferred embodiment of the invention taken in connection with the accompanying drawings, in which:

FIGURE 1 is a block diagram of the present invention;
FIGURE 2 is a circuit diagram illustrating an interstage coupling circuit between two stages of "N" stages of the present invention;
FIGURE 3 is a series of voltage-versus-time graphs which illustrate the operation of a single stage of the present invention; and
FIGURE 4 is a circuit diagram of an embodiment of the interstage coupling circuit of FIGURE 2.

With reference to FIGURE 1, a bilateral RL integrating network 11 is electrically connected between the input of a first gate 12 and a second gate 13. A bias means 14 is electrically connected to gates 12 and 13, and supplies a voltage to the gates to prevent the generation of output pulses in the absence of an input pulse to one of the gates. The conversion of a single input pulse into a pair of identical pulses separated by a delay is accomplished by introducing a pulse, for example, directly to the input of gate 12. Gate 12 responds by issuing a first output pulse at terminal 16. The input pulse is also introduced to RL integrating network 11 which responds by integrating the input pulse to delay the drive to gate 13 for a predetermined interval. Gate 13 responds to the integrated input pulse by issuing a second output pulse at terminal 17 delayed in time from and identical to the first output pulse. The sequence of generation of the time-spaced output pulses may be reversed by introducing the input pulse to the input of gate 13.

An illustration of the circuit details of an embodiment of the present invention is shown in stage 1 of FIGURE 2. Gate 12 comprises a thermionic tube 18 having a load impedance 19 serially connected to its plate 21. Gate 13 similarly comprises a thermionic tube 22 and a load impedance 23 serially connected to its plate 24.

An inductor 26 is electrically connected between control grid 27 of tube 18 and control grid 28 of tube 22. A first parallel combination of a resistor 29 and diode 31 is electrically connected between grid 27 of tube 18 and ground represented as 32. A second parallel combination of a resistor 33 and diode 34 is electrically connected between grid 28 of tube 22 and ground 32. The diodes 31 and 34 are poled to oppose current flow when a positive voltage is present at the control grid to which each is connected. The serial arrangement of inductor 26, and the first and second parallel combinations of resistors and diodes constitutes the bilateral RL integrating network 11 of FIGURE 1.

A first transmission network 36, e.g., an A.C. coupled voltage divider, is electrically connected between plate 21 of tube 18 and grid 28 of tube 22. A second transmission network 37 is similarly connected between plate 24 of tube 22 and grid 27 of tube 18. These transmission networks insure that the delayed output pulse is not generated prematurely.

The positive terminal of bias means 14, a source of D.C. potential, is electrically connected to the common terminal 38a of cathodes 39 and 41 of the thermionic tubes 18 and 22 respectively. The voltage derived from this bias means maintains both tubes 18 and 22 in an inoperative state until an input pulse which is of sufficient amplitude to overcome the effect of the bias voltage is present at the control grid of one of the tubes. Operating power is derived from a source of positive D.C. potential which is introduced at a terminal 42 common to loads 19 and 23. For a more complete understanding of the operation of the invention refer to stage 1 of FIGURE 2, and to FIGURE 3. A positive input pulse 43, having an amplitude of $e_1$ volts sufficient to overcome the cutoff bias of tube 18, is introduced to grid 27 of tube 18. Tube 18 responds to this input pulse 43 by issuing a first output pulse 44 of amplitude $e_{01}$ volts. During the presence of input pulse 43 at grid 27, exponentially increasing current will flow through inductor 26 to grid 28 of tube 22 and then through resistor 33 to ground 32. Simultaneously, a signal voltage representative of the output pulse of tube 18 is also electrically coupled via transmission network 36 to grid 28. This representative signal voltage is in phase opposition to that voltage developed at grid 28 as a result of the exponentially increasing current flowing through resistor 33.

After a period of time, the voltage at grid 28 increases to a sufficient magnitude to overcome the bias voltage maintaining tube 22 inoperative, thus driving tube 22 into conduction. The time associated with the delayed drive is controlled by the parameters of transmission network 36 and the time constant of the integrating network including resistors 29 and 33 with inductor 26.

When tube 22 is driven into conduction, a second output pulse 46 of amplitude $e_{02}$ volts is issued which is substantially identical to and delayed in time from the first output pulse 44. Output pulse 44 is present at an output terminal 47 which is electrically connected to plate 21 of tube 18 and output pulse 46 is present at an output terminal 48 which is electrically connected to plate 24 of tube 22. The parameters of the RL integrating network including resistors 29 and 33 with inductor 26 are selected so that when the grid 28 of tube 22 (also grid 27 of tube 18 when the output pulse sequence is reversed) is driven by an integrated pulse 49, the grid 28 will draw current.

Upon the termination of input pulse 43, diode 31 will be forward biased clamping to ground the end of inductor 26 common to diode 31. The clamping action causes the voltage at grid 28 to increase in magnitude an amount equal to the amplitude $e_1$ of input pulse 43.

The second output pulse 46 is terminated when the voltage at grid 28 decays to the conduction cutoff value of tube 22. The period of conduction of tube 22 is determined by the time constant of inductor 26, the forward biased resistance of diode 31, dynamic cathode-to-grid resistance of tube 22; and the voltage level attained by grid 28. It is to be noted that the time constant referred to supra can be varied by utilizing a second inductor (not shown) to generate a magnetic field in response to a source of D.C. potential (not shown) connected thereto and positioning the second inductor so that the magnetic field generated magnetically couples inductor 26 to the second inductor. By varying the D.C. potential delivered to the second inductor, the effective inductance of inductor 26 as seen by the current passing therethrough can be varied. The pulse generation sequence can be reversed by introducing the input pulse 43 at grid 28 of tube 22. The operation will be identical as described supra except the output pulse issued by tube 22 will precede the output pulse issued by tube 18.

Turning now to entire FIGURE 2 and to FIGURE 4, the circuit details of two stages of "N" number of stages of the electrical circuit described supra and the associated interstage coupling circuits will be described. Since all stages function in an identical manner, attention will be directed to the manner of staging two of such stages. However it should be realized that terminals 50 and 55 may be connected to further stages by similar coupling circuitry to eventually terminate at terminals 50' and 55' of stage N.

In order that the output pulse sequence may be reversed, the coupling circuit includes a first unidirectional transmission path 51 including an electronic gating means 52 electrically connected between the output of one of the gates of stage 1 and the input of one of the gates of stage 2, and a second unidirectional transmission path 53 including an electronic gating means 54 electrically connected between the output of the gate of stage 2 and the input of the gate of stage 1. When the output pulses are initiated by an input pulse to stage 1, gating means 52 responds to the delayed output pulse issued by stage 1 by delivering a pulse to the input of stage 2, thus initiating the generation of a second pair of time-spaced pulses. And when the output pulses are initiated by an input pulse to stage "N," gating means 54 responds to the delayed output pulse subsequently issued by stage 2 by delivering a pulse to stage 1 thus initiating the generation of a pair of time-spaced pulses whose output sequence is reversed from that noted supra.

To insure against the undesired transmission of a pulse, a sequence control 56 responds to an input pulse introduced either at input 1 of stage 1 or input 2 of stage "N" to selectively gate each pair of gating means between successive stages to allow pulse transmission through one transmission path of each pair. For example, a bistable multivibrator, as shown and described in Pulse and Digital Circuits, by Jacob Millman and Herbert Taub, published by McGraw-Hill Book Company, Inc., New York, 1956 ed., pages 140–159, utilized as sequence controller 56 responds to the input pulse to stage 1 by issuing a first and second voltage step in phase opposition to one another. The first and second voltage steps are introduced to buses 57 and 58 respectively. Each bus 57 and 58 is electrically connected to one of the gating means between the successive stages, e.g., bus 57 is connected to gating means 52 and bus 58 is connected to gating means 54. The voltage steps introduced to the gating means sets one gating means to prevent the transmission of a pulse while allowing the remaining gating means to transmit a pulse between successive stages.

A preferred embodiment of the interstage coupling circuit is illustrated in FIGURE 4. "Or" gate 59, e.g., as described and shown in Pulse and Digital Circuits, ibid., pages 394–397, with particular reference to FIGURE 13–5, receives a pulse from tube 22 when an output pulse is issued therefrom and from a tube 61 of stage 2 when an output pulse is issued therefrom. A first coincidence amplifier 62, e.g., as described in Electronics and Radio Engineering by Frederick E. Terman, published by McGraw-Hill Book Company, Inc., New York, fourth ed., page 659, is electrically connected between the output of "or" gate 59 and the input of tube 61. A second coincidence amplifier 63 identical to the first is electrically connected between the output of "or" gate 59 and the input of tube 22. Coincidence amplifiers 62 and 63 receive a voltage step from buses 57 and 58 respectively. The combination of coincidence amplifier 62 and one of the paths through "or" gate 59 constitutes electronic gating means 52 and the combination of the coincidence amplifier 63 and the other path through "or" gate 59 constitutes electronic gating means 54.

When an input pulse is introduced at stage 1, sequence control 56 delivers a positive voltage step via bus 57 to coincidence amplifier 62 to set transmission path 51 in the proper state to deliver a pulse to stage 2. Simultaneously, sequence control 56 delivers a negative voltage step via bus 58 to coincidence amplifier 63 to set transmission path 52 in the proper state to prevent the transmission of a pulse from stage 2 to stage 1.

"Or" gate 59 receives a pulse from tube 22 when an output pulse, e.g., the delayed pulse, is issued therefrom and responds by issuing a pulse to coincidence amplifiers 62 and 63. When the pulse is coincident with the positive voltage step at the input of coincidence amplifier 62, coincidence amplifier 62 responds by issuing a pulse. The issued pulse is delivered to the input of tube 61 to initiate the generation of a second pair of time-spaced pulses. Although the generation of a pair of time-spaced pulses by stage 2 in response to a pulse from coincidence amplifier 62 results in a pulse being introduced through "or" gate 59 to coincidence amplifier 63, it is prevented from being transmitted to stage 1 by the negative voltage step introduced at coincidence amplifier 63.

When the input pulse to multiple pulse generator is introduced at the Nth stage of the staged identical circuits, sequence control 56 responds by reversing the phase of the voltage steps introduced to buses 57 and 58 respectively. Consequently, the transmission paths previously set to transmit a pulse between successive stages, e.g., transmission path 51, is set to prevent the transmission of a pulse between successive stages. And, the transmission paths set to prevent pulse transmission between successive stages, e.g., transmission path, is set to transmit a pulse between stages. Thus, the output pulse sequence of the multiple pulse generator is reversed.

The operation of the staged identical circuits as described supra results in the delayed pulse of a first stage, e.g., stage 1, being generated at the same time as the undelayed pulse of the succeeding stage, e.g., stage 2. This results in the generation of a time-spaced sequence of (N+1) pulses wherein "N" is the number of staged identical pulse generators. However, by connecting an electronic delay means (not shown) e.g., a RL integrating network, between the input of each stage and the output of the coincidence amplifier associated therewith, a time delay is established between the initiation of the delayed output pulse of stage 1 and the initiation of a first output pulse in stage 2. This enables the generation of a time-spaced sequence of 2N pulses by the multiple pulse generator. In the operation of staged identical circuits without the delay means, an output terminal 64, electrically connected to the output of "or" gate 59, can be utilized to obtain a single output pulse as a result of the simultaneous generation of output pulses by tubes 22 and 61. Utilizing a delay means as noted supra, terminals 66 and 67 as shown in FIGURE 2 can be utilized to obtain a second pair of time-spaced pulses from stage 2.

While the present invention has been hereinbefore described with respect to a single embodiment, it will be apparent that numerous modifications in the construction of the multiple pulse generator are possible. For example, the number of pulses composing a sequence of output pulses can be varied by appropriately modulating the bias means. A switching means serially connected between the bias means and the thermionic tube cathodes can be opened at a predetermined time stopping any further generation of pulses. Or, the D.C. level of the bias means can be varied between an exceedingly large cutoff bias value where the pulse generators are inoperative under all input conditions, and a lesser cutoff bias value where an input pulse will cause the generation of a sequence of time-spaced output pulses. Thus, it is not intended to limit the invention except by the terms of the following claims.

What is claimed is:

1. In a pulse generator for converting a single input pulse into a sequence of time-spaced identical output pulses, the combination comprising;
   a first gate circuit having an input terminal and an output terminal,
   a second gate circuit having an input terminal and an output terminal,
   a π connected bilateral RL integrating network including an inductor series element and first and second resistor shunt elements, the time constant of the selected values of which inductor series and shunt resistor elements determine the sequential time spacing of said output pulses, said inductor element serially electrically connected between the input of said first gate circuit and the input of said second gate circuit whereby upon the introduction of a single input pulse to one of said gate circuits an integrated form of said input pulse is transmitted to the input of the remaining gate circuit,
   each of said gate circuits responsive to said input pulse selectively introduced at the input of said gate circuits by issuing an output pulse, and
   energy source means electrically connected to said first and second gate circuits to provide unidirectional operating power.

2. In a multiple pulse generator for converting a single input pulse into a sequence of time-spaced identical output pulses, the combination comprising;
   a first pulse generator including,
   a first gate circuit having input and output terminals,
   a second gate circuit having input and output terminals,
   an inductor electrically connected between the input of said first gate circuit and the input of said second gate circuit,
   a first combination of a resistor and diode electrically connected in parallel relationship, one end of said parallel combination electrically connected to the input of said first gate circuit, a second combination of a resistor and diode electrically connected in parallel relationship, one end of said second parallel combination electrically connected to the input of said second gate circuit, the remaining terminal of said second parallel combination electrically connected to the remaining end of said first parallel combination, said diodes poled to oppose current flow when the gate circuit to which they are respectively connected is in the conducting state, a first transmission network electrically connected between the output of said first gate circuit and the input of said second gate circuit to transmit a signal from said first gate to said second gate that is representative of the output pulse issued from said first gate circuit, and
   a second transmission network electrically connected between the output of said second gate circuit and the input of said first gate circuit to transmit a signal from said second gate to said first gate that is representative of the output pulse issued from said second gate circuit,
   said representative signal transmitted being in phase opposition to the input pulse,
   a second pulse generator identical to said first pulse generator,
   the output of one of the gates of said first pulse generator serially connected to the input of one of the gates of said second pulse generator to provide a first unidirectional conduction path therebetween, the output of said gate of said second pulse generator serially connected to the input of said gate of said first pulse generator to provide a second unidirectional conduction path therebetween,
   a first electronic gating means included in said first conduction path,
   a second electronic gating means included in said second conduction path, and
   circuit means sensitive to the conducting sequence of the gates of said pulse generators, said circuit means being responsive to the conducting sequence by setting the electronic gating means connected to the pulse generator output at which the delayed pulse of the time-spaced pulses is present to allow signal transmission therethrough and setting the other electronic gating means to prevent signal transmission therethrough.

3. The multiple pulse generator as recited in claim 2, further defined by;
   a first input of said circuit means electrically connected to the input of the remaining gate of the first pulse generator of the serially connected pulse generators,
   a second input of said circuit means electrically connected to the input of the last of said serially connected pulse generators,
   said circuit means responsive to an input pulse to the first pulse generator by generating a first pair of gate signals in phase opposition to one another, said circuit means responsive to an input pulse to the last of a series of serially connected pulse generators by generating a second pair of gate signals in phase opposition to one another, the phase of said second pair of gate signals being reversed from the phase of said first pair of gate signals,
   one of said gate signals of the pair of gate signals introduced to said first gating means, the other gate signal of said pair introduced to said second gating means, one of said gating means responsive to the gate signal introduced thereto to allow signal transmission between successive pulse generators of said serially connected pulse generators, and the other gating means responsive to the gate signal introduced thereto to prevent signal transmission between said successive pulse generators of said serially connected pulse generators.

4. The multiple pulse generator as recited in claim 2, further defined by;
- a first electronic delay means electrically interposed said first electronic gating means and the input of the gate of said second pulse generator, and
- a second electronic delay means electrically interposed said second electronic gating means and the input of the gate of said first pulse generator.

5. The multiple pulse generator as recited in claim 2, wherein;
- said first and second unidirectional conduction paths include an "or" gate, said "or" gate having at least two input terminals and one output terminal, the output of one of the gates of a first pulse generator electrically connected to a first input terminal of said "or" gate, the output of one of the gates of a second pulse generator electrically connected to a second input terminal of said "or" gate,
- said first gating means is a first coincidence amplifier, the output terminal of said "or" gate electrically connected to the input terminal of said first coincidence amplifier, the output terminal of said first coincidence amplifier electrically connected to the input of said gate of said second pulse generator to provide a unidirectional conduction path therebetween,
- said second gating means is a second coincidence amplifier, the output terminal of said "or" gate electrically connected to the input terminal of said second coincidence amplifier, the output terminal of said second coincidence amplifier electrically connected to the input of said gate of said first pulse generator to provide a unidirectional conduction path therebetween, and
- said circuit means is responsive to the conducting sequence of said gates of said pulse generators to control the conduction states of said coincidence amplifiers.

6. In a multiple pulse generator for converting a single input pulse into a sequence of time-spaced identical output pulses, the combination comprising;
- a first and a second thermionic tube, each having at least a plate electrode, a cathode electrode and a control grid,
- a first load impedance connected to the plate electrode of said first tube,
- a second load impedance connected to the plate electrode of said second tube,
- an energy source means in serial connection with each tube and load impedance to provide unidirectional operating power thereto,
- bias means connected to said first tube and second tube to main said tubes in the inoperative state in the absence of an input pulse to one of said tubes,
- an inductor electrically connected between the control grid of said first tube and the control grid of said second tube,
- a first combination of a resistor and diode electrically connected in parallel relationship, one end of said parallel combination electrically connected to the control grid of said first tube,
- a second combination of a resistor and diode electrically connected in parallel relationship, one end of said parallel combination electrically connected to the control grid of said second tube, the remaining end of said second parallel combination electrically connected to the remaining end of said first parallel combination,
- each of said tubes being responsive to an input pulse selectively introduced at the control grid of one of said tubes by issuing an output pulse,
- a first transmission network electrically connected between the plate of said first tube and the control grid of said second tube to transmit a signal from said first tube to said second tube that is representative of the output pulse issued from said first tube, and
- a second transmission network electrically connected between the plate of said second tube and the control grid of said first tube to transmit a signal from second tube to said first tube that is representative of the output pulse issued from said second tube, said representative signals transmitted being in phase opposition to the input pulse to said multiple pulse generator.

7. In a pulse generator for converting a single input pulse into a sequence of time-spaced identical output pulses, the combination comprising:
- a first gate circuit having an input terminal and an output terminal,
- a second gate circuit having an input terminal and an output terminal,
- a π-connected bilateral RL integrating network including an inductor series element and first and second resistor shunt elements, said resistor and inductor selected to provide a predetermined time constant, said inductor element serially electrically connected between the input of said first gate circuit and the input of said second gate circuit, whereby upon the introduction of a single input pulse to one of said gate circuits, an integrated form of said input pulse is transmitted to the input of the remaining gate circuits,
- a first diode electrically connected in parallel relationship with said first resistor,
- a second diode electrically connected in parallel relationship with said second resistor, said diodes poled to oppose current flow when the gate circuit to which they are respectively connected is in the conducting state,
- each of said gate circuits responsive to said input pulse selectively introduced at the input of said gate circuits by issuing an output pulse, and
- energy source means electrically connected to said first and second gate circuits to provide unidirectional operating power.

8. A pulse generator as recited in claim 7, further defined by;
- a first transmission network electrically connected between the output of said first gate circuit and the input of said second gate circuit to transmit a signal from said first gate to said second gate that is representative of the output pulse issued from said first gate circuit, and
- a second transmission network electrically connected between the output of said second gate circuit and the input of said first gate circuit to transmit a signal from said second gate to said first gate that is representative of the output pulse issued from said second gate circuit,
- said representative signal transmitted being in phase opposition to the input pulse.

References Cited by the Examiner

UNITED STATES PATENTS

| | | | |
|---|---|---|---|
| 3,093,798 | 6/1963 | Jacobsen | 328—55 X |
| 3,124,707 | 3/1964 | Thomasson | 307—88.5 |

ARTHUR GAUSS, *Primary Examiner.*

S. D. MILLER, *Assistant Examiner.*